Oct. 25, 1932.  A. H. STRONG  1,884,352
REFRIGERATING SYSTEM
Filed June 6, 1929  2 Sheets-Sheet 1
FIG. I.
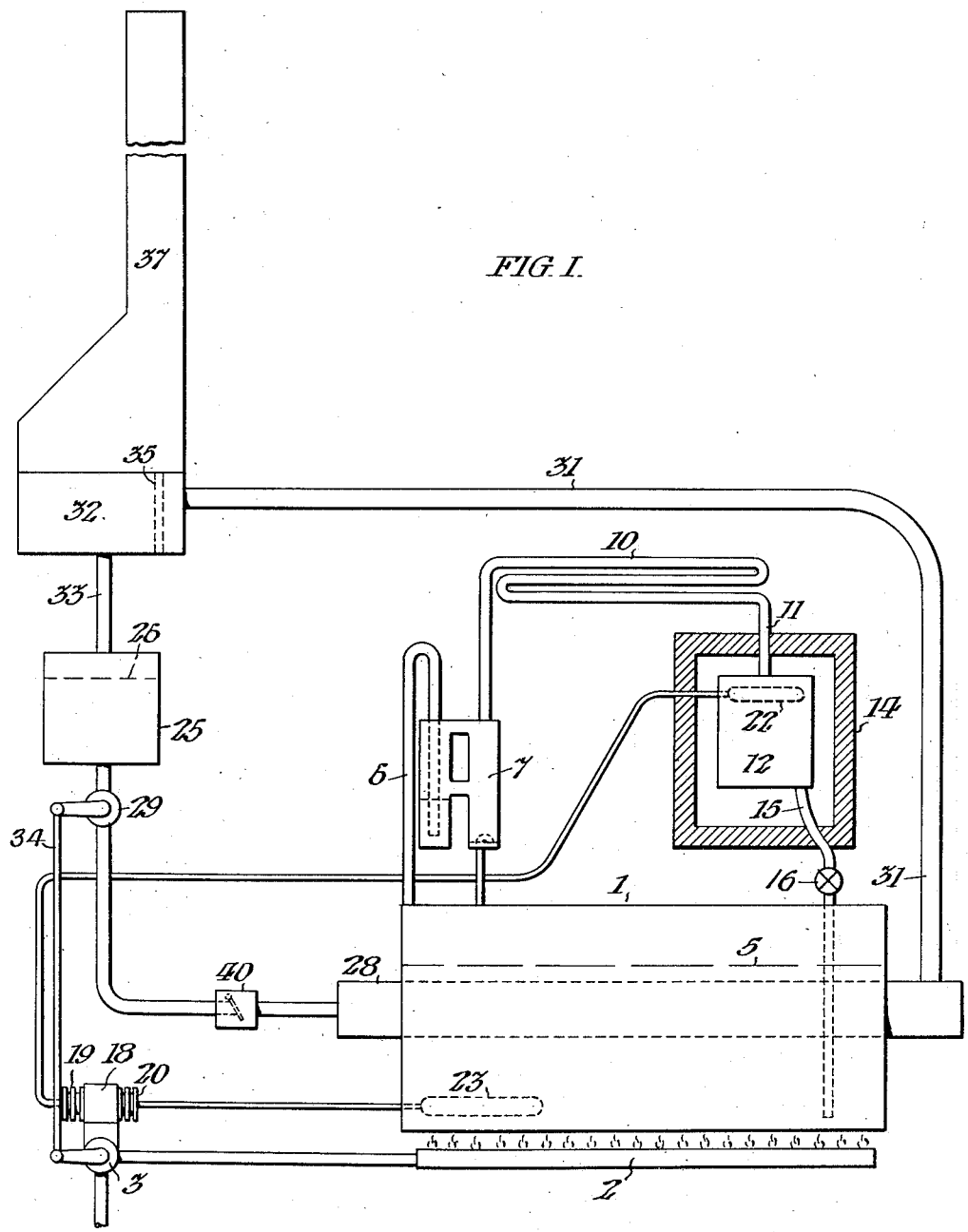
INVENTOR:
ARCHIE HUGH STRONG,

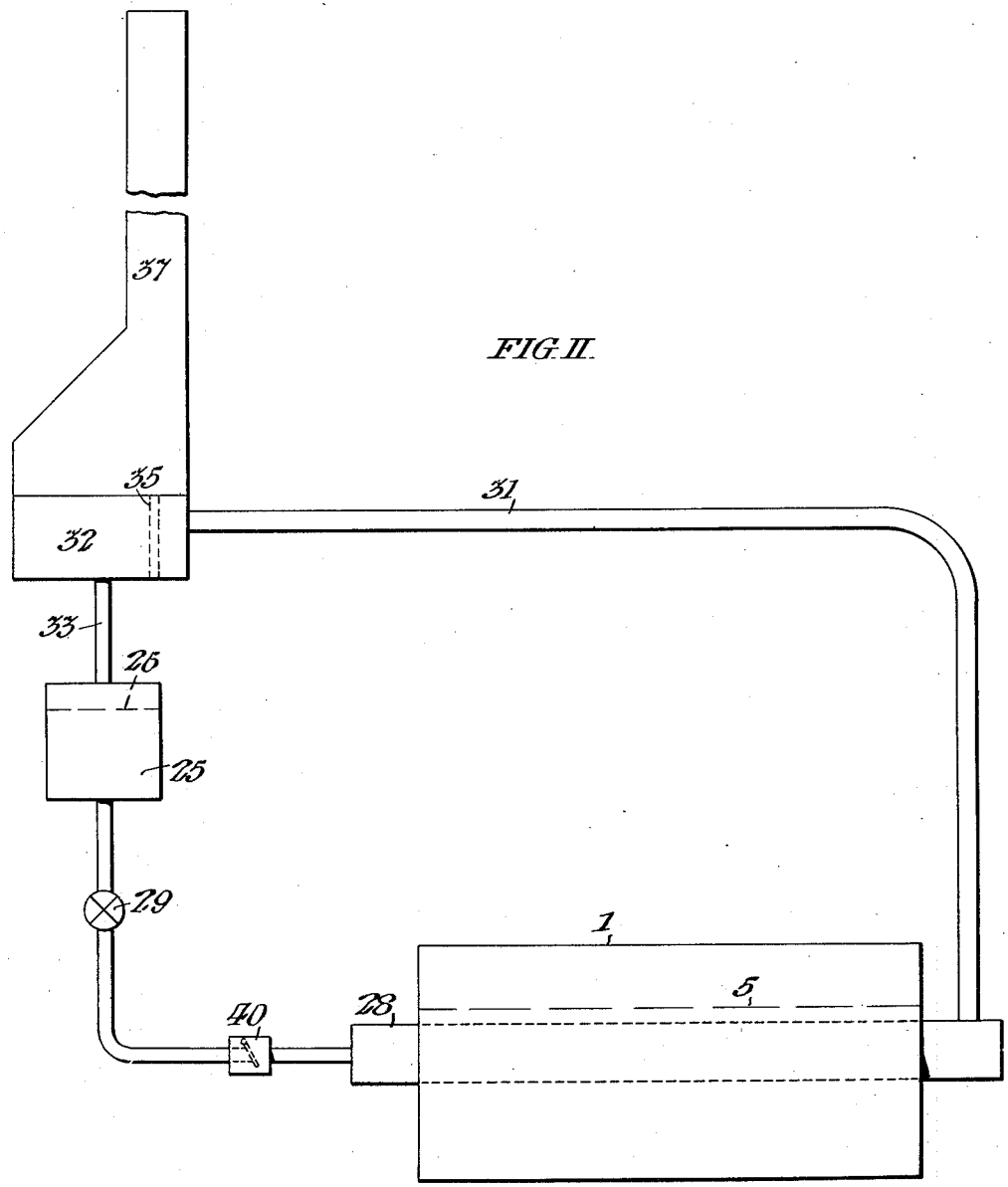
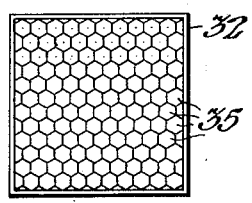

Patented Oct. 25, 1932

1,884,352

UNITED STATES PATENT OFFICE

ARCHIE HUGH STRONG, OF NORRISTOWN, PENNSYLVANIA, ASSIGNOR TO MASTER DOMESTIC REFRIGERATING COMPANY, INC., OF CONSHOHOCKEN, PENNSYLVANIA, A CORPORATION OF NEW YORK

REFRIGERATING SYSTEM

Application filed June 6, 1929. Serial No. 368,791.

My invention is particularly adapted for use in refrigerating apparatus of the absorption type, and particularly such apparatus in which aqua ammonia is the primary refrigerant. Such apparatus includes a generator in which the ammonia gas is generated from the water by the application of heat. Ordinarily, at the conclusion of the heating cycle, the residual water in the generator is cooled to such a degree as to permit it to reabsorb the ammonia gas, by the application of cooling water which is caused to flow through the apparatus from a reservoir to a waste outlet. Although such cooling means may be conveniently employed where there is a continual supply of tap water as in urban communities; it necessitates piping connections to the refrigerator structure leading both from the supply and to the sewer or other drainage system and, therefore, is always costly to install. Moreover, in localities which are not supplied with water under pressure, such cooling means is prohibitive in cost for it necessitates the installation not only of supply and drainage pipes, but of pumping means to circulate the water.

Therefore, it is the object and effect of my invention to substitute for such water cooling means in a refrigerating system of the absorption type, of a secondary refrigerating system, inclosing a secondary refrigerant capable of boiling at a lower temperature than the primary refrigerant. As hereinafter described, the secondary refrigerating system includes a liquid trap and a valve between said trap and said generator, whereby, when said valve is closed, during the heating cycle of the primary refrigerant, the secondary refrigerant, may be held in a liquid state in said trap to exclude such liquid refrigerant from the portion of its circuit extending in said generator, and thus avoid any cooling effect upon the generator during the heating cycle of the latter. In the system chosen for illustration; the heating means for the generator are automatically controlled by thermostatic means, in accordance with the temperature of the main refrigerant, and such controlling means is operatively connected with the trap valve aforesaid; so that said heater and valve are rendered alternately operative.

My invention includes the various novel features of construction and arrangement hereinafter more definitely specified.

In said drawing; Fig. I is a diagrammatic elevation of a refrigerating system, of the absorption type, in conjunction with a secondary cooling system for the main generator.

Fig. II is a diagrammatic elevation of said secondary cooling system.

Fig. III is a plan view of the cellular radiator unit which is included in said secondary system.

In said drawings; the main refrigerant generator 1 is arranged to be intermittently heated by the gas burner 2 controlled by the valve 3. Said generator 1 is part of a closed container for the main refrigerant, for instance aqua ammonia 5, and including the conduit 6 leading through the rectifier 7 to the condenser 10, and the conduit 11 leading to the evaporator 12 in the insulated refrigerating inclosure 14, and the conduit 15 leading back to said generator 1, through the valve 16.

Said burner control valve 3 is arranged to be opened and closed through mechanism in the casing 18 under control of alternately expansible devices 19 and 20, for instance sylphon bellows; said bellows 19 being operatively connected with the thermostatic bulb 22 which is subject to the temperature of the main refrigerant, conveniently in the evaporator 12; so that said burner valve 3 is opened to heat the generator 1 when said bulb 22 reaches a predetermined temperature which is relatively high for the refrigerator 14. Said bellows 20 is operatively connected with the thermostatic bulb 23 in the generator 1 so that said burner valve 3 is closed when said bulb 23 reaches a predetermined temperature which is relatively high for the contents of said generator.

As above noted; ordinarily, such a generator 1 is arranged to be cooled by the flow of tap water with respect thereto when the burner valve 3 is closed, but, in accordance with my invention, in lieu of such ordinary cooling means, I provide a secondary closed circuit including the liquid trap 25 containing a secondary refrigerant 26 capable of boiling at a lower temperature than said main refrigerant 5. Said secondary circuit includes the conduit 28 extending in and out of said generator 1, and the valve 29 between said trap 25 and said generator 1; whereby, when said valve 29 is closed, the secondary refrigerant 26, in a liquid state, is excluded from the portion of its circuit extending in said generator 1. However, said conduit 28 is connected by the conduit 31, with the radiator 32, conveniently of the cellular type having air passageways 35 therethrough and connected by the conduit 33, with said trap 25; so that when said valve 29 is opened, said secondary refrigerant 26 may gravitate from said trap 25 through said conduit 29, be boiled by the heat which it absorbs from the hot primary refrigerant residue 5 in said generator and, being thus vaporized, may be recondensed to the liquid state.

Said burner valve 3 is cooperatively connected with said secondary refrigerant valve 29, for instance by the link 34, so that when said valve 3 is shut, said valve 29 is opened, and vice versa. However, any suitable connecting means may be employed to open said valve 29 whenever it is desired to cool the generator 1.

Said radiator 32 is conveniently of the cellular type having air passageways 35 therethrough, and the natural convection currents of air through said passageways 35 may be augmented to any desired degree by providing said radiator 32 with the stack 37, the upper end of which is open to the atmosphere.

Although in the arrangement shown, the head of liquid 26 between the trap 25 and generator 1 is sufficient to prevent backward flow of the vapor of said liquid in the conduit 28; under some circumstances, I prefer to also include in the apparatus a check valve 40 to prevent such backward flow, regardless of the head of liquid between the generator 1 and the trap 25.

Although ordinary alcohol may be used as the secondary refrigerant aforesaid, I prefer to employ ethyl chloride. However, it is to be understood that any suitable material may be employed which is liquefiable and which boils at a temperature lower than that of the primary refrigerant. Moreover, although I have shown the various elements of the apparatus, diagrammatically, in such spaced position as to indicate their schematic relation; I find it convenient in practice to arrange said elements more compactly within the outer casing of the refrigerator inclosure.

Therefore, I do not desire to limit myself to the precise details of construction and arrangement herein set forth, as it is obvious that various modifications may be made therein without departing from the essential features of my invention as defined in the appended claims.

I claim:

1. In a refrigerating system of the absorption type; the combination with a main refrigerating apparatus inclosing a primary refrigerant and including a generator, a condenser and an evaporator, connected in a closed conduit circuit, means adapted to intermittently heat said generator, and thermostatic means adapted to automatically control said heating means in accordance with the temperature of said primary refrigerant; of means adapted to intermittently cool said generator, including a secondary closed conduit circuit with a liquid trap, and a cellular radiator including air passageways and separate adjoining passageways containing a secondary refrigerant, capable of boiling at a lower temperature than said primary refrigerant; said secondary conduit circuit extending in and out of said generator; means adapted to induce air flow through said radiator, including a stack open to the atmosphere; a valve in said secondary circuit, between said trap and said generator; whereby, when said valve is closed, the secondary refrigerant, in a liquid state, may be excluded from the portion of its circuit extending in said generator; and means operatively connecting said heater and valve, whereby they are rendered alternately operative by said thermostatic means.

2. In a refrigerating system of the absorption type; the combination with a main refrigerating apparatus inclosing a primary refrigerant and including a generator, a condenser and an evaporator, connected in a closed conduit circuit, and means adapted to intermittently heat said generator; of means adapted to intermittently cool said generator, including a secondary closed conduit circuit with a liquid trap, and a radiator including air passageways and separate adjoining passageways containing a secondary refrigerant, capable of boiling at a lower temperature than said primary refrigerant; said secondary conduit circuit extending in and out of said generator; means adapted to induce air flow through said radiator; a valve in said secondary circuit, between said trap and said generator; whereby, when said valve is closed, the secondary refrigerant, in a liquid state, may be excluded from the portion of its circuit extending in said generator; thermostatic means including a valve adapted to be operated by the changes in temperature at said generator; and means operatively connecting said heater and valve, whereby they are rendered alternately operative, by said thermostatic means.

3. In a refrigerating system of the absorption type; the combination with a primary refrigerating apparatus including a generator, means adapted to intermittently heat said generator, and thermostatic means adapted to automatically control said heating means in accordance with the temperature of the primary refrigerant; of means adapted to intermittently cool said generator, including a liquid trap and a radiator including air passageways and separate adjoining passageways containing a secondary refrigerant, capable of boiling at a lower temperature than said primary refrigerant; said secondary conduit extending in and out of said generator; means adapted to induce air flow through said radiator; a valve in said secondary conduit, between said trap and said generator; whereby, when said valve is closed, the secondary refirgerant, in a liquid state, may be prevented from extending in said generator; and connecting means whereby said heater and valve are rendered alternately operative.

4. In a refrigerating system of the absorption type; the combination with a primary refrigerating apparatus inclosing a primary refrigerant and including a generator, means adapted to intermittently heat said generator, and thermostatic means adapted to automatically control said heating means; of means adapted to intermittently cool said generator, including a liquid trap and a radiator including air passageways and separate adjoining passageways containing a secondary refrigerant; said secondary conduit extending in and out of said generator; means adapted to induce air flow through said radiator; a valve in said secondary conduit, between said trap and said generator; whereby, when said valve is closed, the secondary refrigerant, in a liquid state, may be excluded from extending in said generator; and means whereby said heater and valve are rendered alternately operative.

In testimony whereof, I have hereunto signed my name at Conshohocken, Pennsylvania, this fourth day of June, 1929.

ARCHIE HUGH STRONG.